(12) United States Patent
Ollier (10) Patent No.: US 10,327,424 B2
(45) Date of Patent: Jun. 25, 2019

(54) DEVICE AND METHOD FOR MANAGING BIRD POPULATIONS

(71) Applicant: Ecolab USA Inc., St. Paul, MN (US)

(72) Inventor: Steven Ollier, Strilingshire (GB)

(73) Assignee: Ecolab USA Inc., St. Paul, MN (US)

( * ) Notice: Subject to any disclaimer, the term of this patent is extended or adjusted under 35 U.S.C. 154(b) by 205 days.

(21) Appl. No.: 15/601,015

(22) Filed: May 22, 2017

(65) Prior Publication Data

US 2018/0000054 A1   Jan. 4, 2018

Related U.S. Application Data

(60) Provisional application No. 62/340,228, filed on May 23, 2016.

(51) Int. Cl.
| | | |
|---|---|---|
| *A01K 45/00* | (2006.01) | |
| *A01K 33/00* | (2006.01) | |
| *A01K 37/00* | (2006.01) | |
| *A01K 43/00* | (2006.01) | |
| *A22B 3/00* | (2006.01) | |
| *A01M 19/00* | (2006.01) | |
| *A01M 29/00* | (2011.01) | |

(52) U.S. Cl.
CPC .............. *A01K 45/00* (2013.01); *A01K 33/00* (2013.01); *A01K 37/00* (2013.01); *A01K 43/00* (2013.01); *A01M 19/00* (2013.01); *A22B 3/00* (2013.01); *A01M 29/00* (2013.01); *B64C 2201/12* (2013.01)

(58) Field of Classification Search
CPC ....... B64C 2201/12; A01M 19/00; A22B 3/00
See application file for complete search history.

(56) References Cited

U.S. PATENT DOCUMENTS

| | | | |
|---|---|---|---|
| 6,653,971 B1 * | 11/2003 | Guice ................... | A01M 1/026 342/22 |
| 6,853,328 B1 | 2/2005 | Guice et al. | |

(Continued)

FOREIGN PATENT DOCUMENTS

| | | |
|---|---|---|
| CA | 2821932 A1 | 1/2015 |
| CN | 104186458 | 12/2014 |

(Continued)

OTHER PUBLICATIONS

Anonymous: "Anti-seagull drones could be introduced in UK-Telegraph", Aug. 13, 2015, XP055405171, retrieved from the Internet: URL:http://www.telegraph.co.uk/news/newstopics/howaboutthat/11799024/Anti-seagull-dr ones-could-be-introduced-in-UK.html [retrieved on Aug. 8, 2017], 3 pages.

(Continued)

*Primary Examiner* — Christopher P Ellis (74) *Attorney, Agent, or Firm* — Merchant & Gould P.C.

(57) ABSTRACT

The system for managing bird populations includes a drone; a disruptor comprising an extension arm having a proximal end and a distal end, the proximal end being operatively coupled with the drone, and the distal end comprising a tool portion, where the tool portion comprises a piercing element constructed for engagement with one or more eggs in a nest; and a remote control system. The remote control system may comprise one or more remote control units and a monitor.

24 Claims, 5 Drawing Sheets

(56) References Cited

U.S. PATENT DOCUMENTS

| | | | | |
|---|---|---|---|---|
| 7,501,979 | B1* | 3/2009 | Guice | A01M 1/026 235/400 |
| 9,693,547 | B1* | 7/2017 | Moitier | A01M 5/02 |
| 2014/0148978 | A1 | 5/2014 | Duncan et al. | |
| 2015/0127209 | A1 | 5/2015 | Al-Garni et al. | |
| 2016/0183514 | A1* | 6/2016 | Dederick | A01M 29/06 119/713 |
| 2016/0378109 | A1* | 12/2016 | Raffa | G05D 1/0038 701/2 |
| 2018/0064094 | A1* | 3/2018 | Cantrell | G05D 1/0011 |

FOREIGN PATENT DOCUMENTS

| | | |
|---|---|---|
| CN | 104381241 | 3/2015 |
| DE | 202014009166 U1 | 2/2015 |
| WO | 2014/080387 A2 | 5/2014 |

OTHER PUBLICATIONS

Canada Goose Management: "Best Practices for Destroying Eggs or Preventing Hatching", Dec. 31, 2011, XP055405176, retrieved from the Internet: URL:http://publications.gc.ca/collections/collection_2011/ec/CW66-293-1-2011-eng.pdf [retrieved on Sep. 8, 2017].

Cousins,Untitled, Farmers Weekly, GB.,161(14) 4 pages (Apr. 7, 2014).

Grimm et al., "Autonomous Unmanned Aerial Vehicle System for Controlling Pest Bird Population in Vineyards," ASME 2012 International Mechanical Engineering Congress and Exposition, 4 (Parts A and B) 499-505 (Nov. 9-15, 2012)(Abstract).

Notification of Transmittal of the International Search Report and the Written Opinion of the International Searching Authority, or the Declaration, International application No. PCT/US2017/033836, dated Sep. 25, 2017 (17 pages).

International Search Report and Written Opinion of the International Searching Authority, PCT/US2017/033836, dated Sep. 25, 2017.

* cited by examiner

DEVICE AND METHOD FOR MANAGING BIRD POPULATIONS

CROSS-REFERENCE TO RELATED APPLICATION

This application claims the benefit of U.S. Provisional Application No. 62/340,228, filed May 23, 2016, and is hereby incorporated by reference in its entirety.

FIELD

The present disclosure relates to devices and methods for managing bird populations. In particular, the present disclosure relates to devices and methods for managing or reducing populations of nuisance birds in urban areas.

BACKGROUND

Certain species of birds, such as seagulls, may become a nuisance in urban areas when the birds nest on or near buildings or other areas used by humans. The birds may generally cause unsanitary conditions in the area and may become aggressive toward humans during breeding season. In an effort to protect their young or to try to gain access to food, the birds may even attack humans. In some areas reports of seagull attacks leading to injuries have become increasingly common.

Populations of such birds nesting on or near buildings, such as on roof tops or other areas, can be managed by removing nests or eggs, or by breaking eggs to prevent them from hatching. However, such work can be very challenging, as the nests can be in hard-to-reach areas that cannot be easily or safely accessed even by the use of long-armed tools, and because the birds may become aggressive when the nests are disturbed.

It is against this background that the present disclosure is made.

SUMMARY

The present disclosure relates to devices and methods for managing bird populations. In particular, the present disclosure relates to devices and methods for managing or reducing populations of nuisance birds in urban areas. The system for managing bird populations includes a drone; a disruptor comprising an extension arm having a proximal end and a distal end, the proximal end being operatively coupled with the drone, and the distal end comprising a tool portion, where the tool portion comprises a piercing element constructed for engagement with one or more eggs in a nest; and a remote control system. The remote control system may comprise one or more communication features such as remote control units, transmitters, receivers, GPS receivers, or monitors. The hub and piercing elements may have additional features such as a hub with a convex shape, a hub with a bowl shape, piercing elements that are needles, piercing elements constructed out of metal or stainless steel, and an actuator or extension arm for positioning the disruptor. As an alternative to piercing elements, the hub may have a blunt object, grabber, hook, scoop, planar spatula, reservoir, nozzle, or microwave source to disrupt the eggs. The drone may have several features such as a body, frame, rotor arms, a motor, battery or power source, and landing gear.

The system can be used as a method to manage bird populations by flying the drone above a bird's nest; positioning the drone above the bird's nest; and descending the drone to disrupt eggs in the bird's nest with the disruptor. GPS data can be used to assist with the location of birds' nests.

BRIEF DESCRIPTION OF DRAWINGS

The various described features are not drawn to scale but are drawn to depict certain features relevant to the disclosure. Reference characters denote like features throughout the figures.

DETAILED DESCRIPTION

The present disclosure relates to devices and methods for managing bird populations. In particular, the present disclosure relates to devices and methods for managing or reducing populations of nuisance birds in urban areas. The present disclosure further relates to the use of the device described herein.

The term "about" is used in conjunction with numeric values to include normal variations in measurements as expected by persons skilled in the art, and is understood have the same meaning as "approximately" and to cover a typical margin of error, such as ±5% of the stated value.

Unmanned airplanes, commonly referred to as drones, can be used, among other things, to perform many tasks that would be difficult or dangerous for humans. Drones can be used to gain access to difficult-to-reach areas while being controlled and monitored through remote control systems. Drones are available in many configurations, but typically include a light-weight frame, one or more rotors, a motor, a signal receiver, optional accessories, such as a camera, and a remote control unit to operate the drone. However, presently available drones are not configured for managing bird populations.

Figure 1:
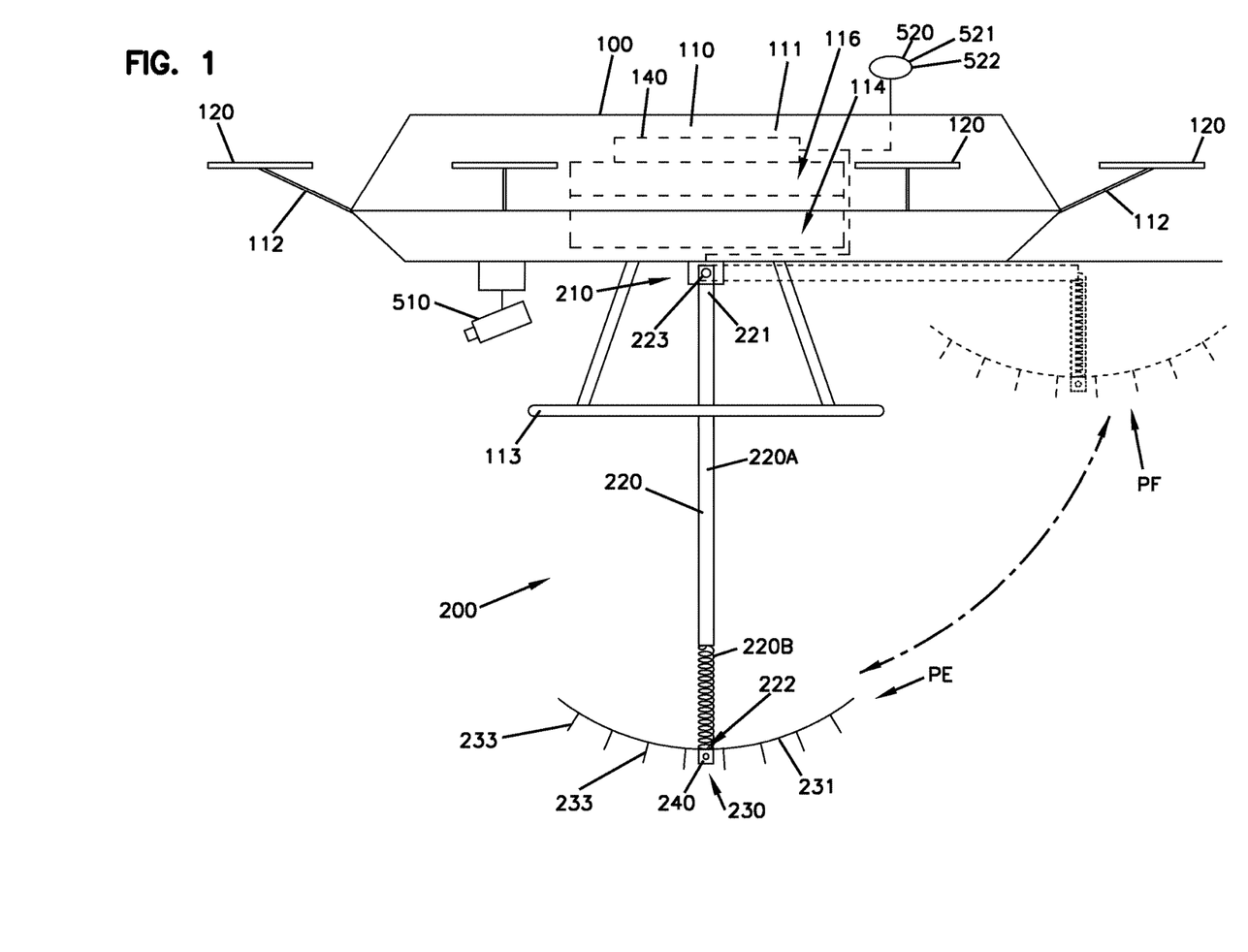
FIG. 1 shows a schematic side view of a drone as part of a system for managing bird populations according to an embodiment.
Figure 5:
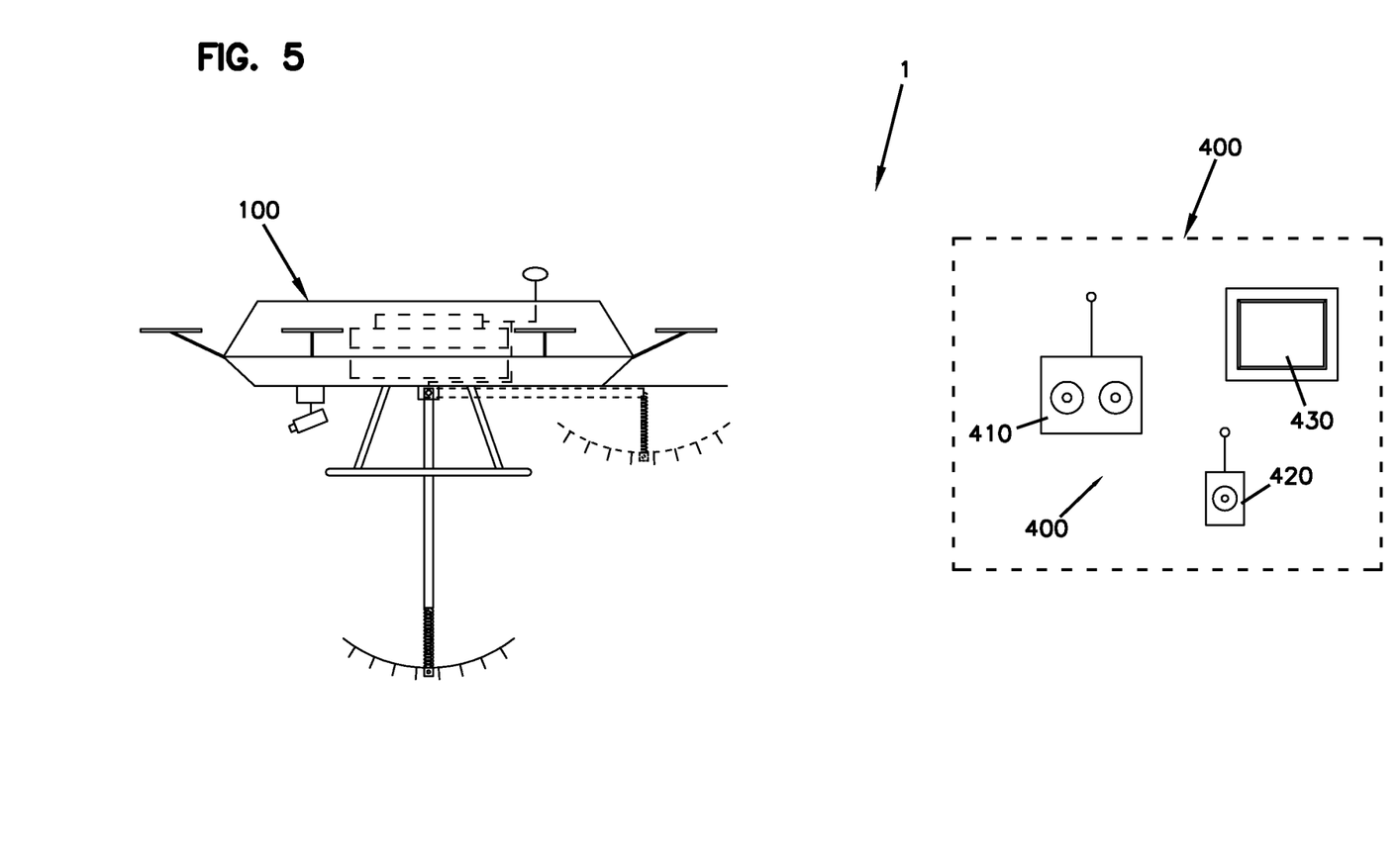
FIG. 5 shows a schematic depiction of the system in accordance with the present disclosure.

According to at least some embodiments of the present disclosure as shown in FIGS. 1 and 5, a system 1 for managing bird populations includes a drone 100 that can be equipped with a disruptor 200 comprising an extension arm 220 adapted for breaking, piercing, displacing, or removing eggs or nests. The system 1 can be used to fly the drone 100 over roof tops and other hard-to-reach areas and to position and lower the drone 100 to the nests that need to be managed. The system 1 can further include a remote control system 400 for controlling the drone 100. Progress of managing the nests can be monitored through a remote monitoring system, which may be part of the remote control system 400.

Any suitable drone, such as a commercially available multi-rotor drone, can be modified for use in the present system 1. The drone 100 may include a frame 110 with a main body 111, a plurality of rotor arms 112 coupled with the frame 110, and landing gear 113 extending from the frame 110 with rotors 120 rotatably attached to the rotor arms 112. A motor 114 can be housed inside the main body 111 and is operatively coupled with the rotors 120. The motor 114 is powered by a power source 116, such as a rechargeable battery. The drone 100 may also include a drone control unit 140 connected to a receiver 521. The receiver 521 is configured to receive remote control signals from a remote control unit. In some embodiments the drone 100 has between 3 and 8 rotors 120, or between 4 and 6 rotors 120. For example, the drone 100 may have 4, 5, or 6 rotors. The drone 100 is preferably constructed to be lightweight and durable and has a modular construction that allows for easy replacement of parts. In the embodiments, the drone 100 is sized so that it is capable of carrying and operating the disruptor 200.

In an embodiment, the drone 100 is outfitted with a disruptor 200, as shown in FIG. 1. The disruptor 200 is adapted to compromise eggs in a nest to prevent the eggs from hatching and to subsequently prevent unwanted nuisances, such as aggressive bird attacks on people near the nest. In some embodiments, the disruptor 200 comprises an extension arm 220. The extension arm 220 can be attached to the bottom of the frame 110 at a first (proximal) end 221. Alternatively, the extension arm can be attached to another part of the drone 100, such as the side, one of the rotor arms 112, or the landing gear 113. However, the extension arm 220 is preferably positioned below the main body 111 at or near the center of the drone 100, below the center of gravity. Positioning the extension arm 220 below the center of gravity of the drone 100 helps balance the drone 100 and minimizes interference with controlling the drone 100. The extension arm 220 can be directly attached to the main body 111 or can be coupled with the main body 111 through a separate motor 210 or gear box for moving the extension arm 220, where the motor 210 or gear box is attached to the main body 111.

At its second (distal) end 222, the extension arm 220 is coupled with a tool portion 230. In some embodiments, the tool portion 230 is constructed to pierce one or more eggs in a nest. In other embodiments, the tool portion 230 is adapted to either break the eggs, pierce the eggs, remove the eggs, displace the eggs from the nest, or remove or displace the nest. When the drone 100 is lowered to a bird's nest, the tool portion 230 of the extension arm 220 engages with the nest or the eggs in the nest. In the exemplary embodiment shown in FIGS. 1 and 2, the tool portion 230 is adapted to engage with the eggs by making a small hole in the egg shell to pierce the eggs. The process may optionally be monitored through a camera 240 that may be positioned in or on the tool portion 230.

Figure 2:
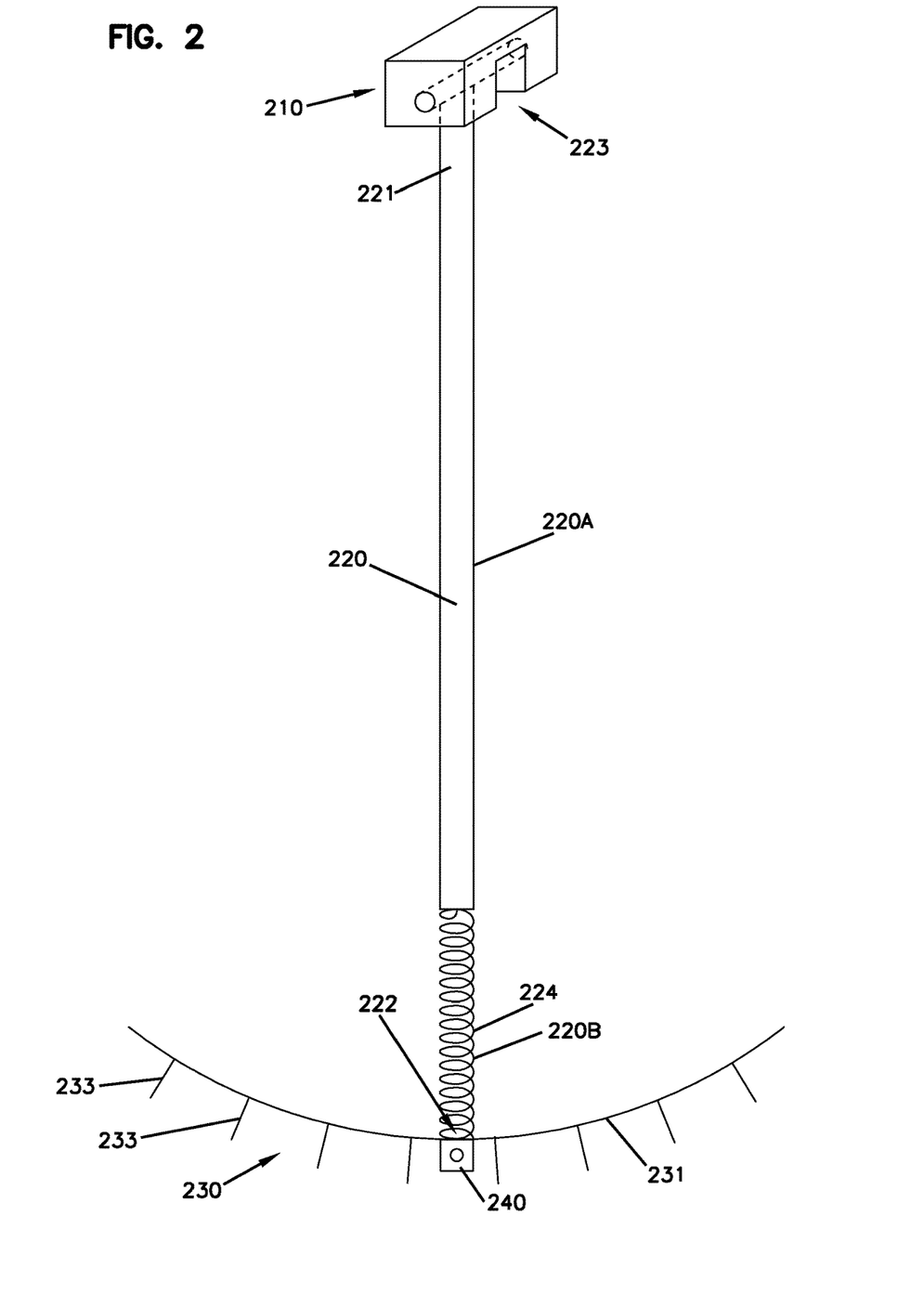
FIG. 2 shows a schematic view of a disruptor in the drone of FIG. 1.
Figure 3A:
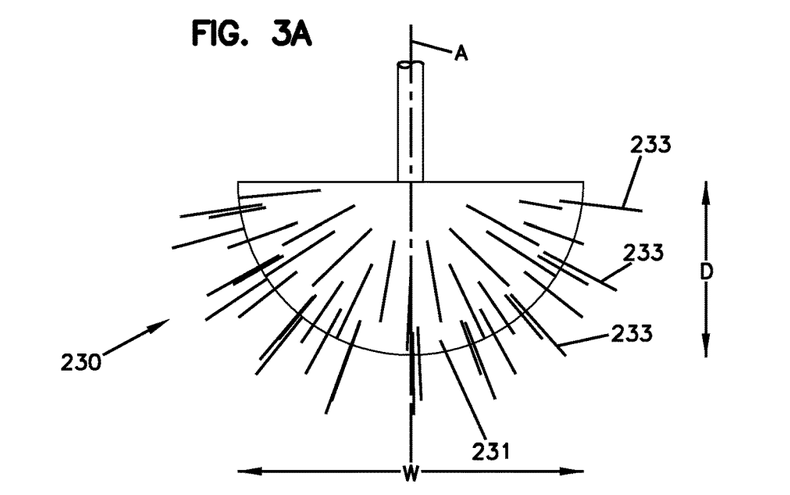
FIG. 3A shows a first embodiment of a tool portion of the drone of FIG. 1.
Figure 3B:
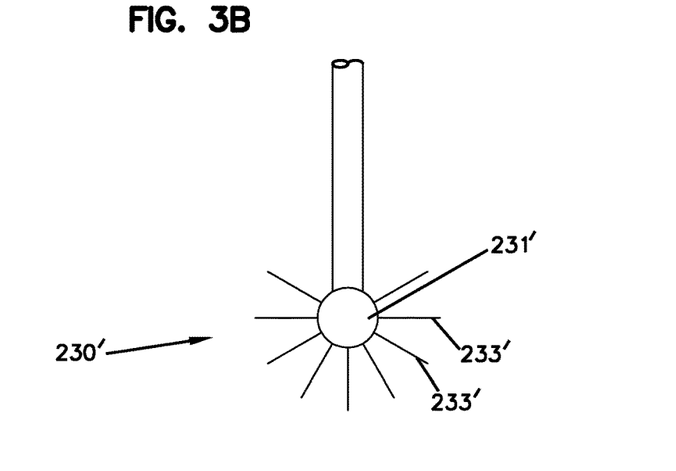
FIG. 3B shows a second embodiment of a tool portion of the drone of FIG. 1.
Figure 3C:
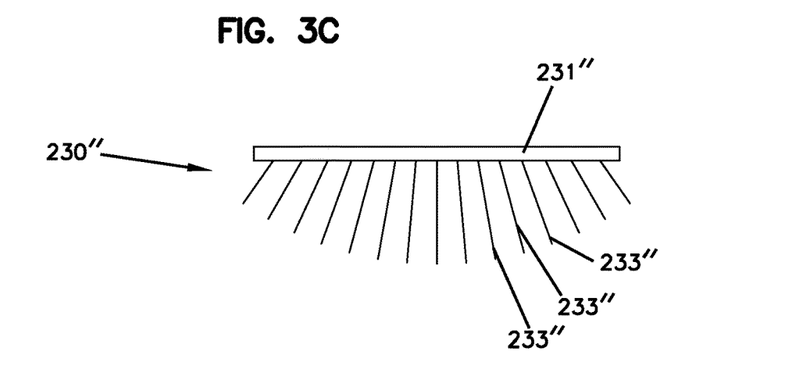
FIG. 3C shows a third embodiment of a tool portion of the drone of FIG. 1.

In the exemplary embodiment shown in FIGS. 1 and 2, the tool portion 230 comprises a hub 231 coupled with one or more piercing elements 233 extending outwardly from the hub 231. The hub 231 may have any suitable shape, such as spherical, ovoid, flat, irregular, or be shaped like a bowl. Exemplary embodiments of the tool portion 230 are shown in FIGS. 3A-3C. The tool portion 230 may optionally be removable and/or interchangeable.

In one embodiment, the hub 231 has a convex outer surface shaped like a bowl. The bowl shape may be open or closed at the top, or may optionally be covered by a lid on the top side. The convex outer surface of the hub 231 can be solid or perforated, or have a lattice configuration. A plurality of piercing elements 233 may extend radially from the outer surface of the hub 231. In alternative embodiments, the piercing elements 233 can extend in a direction of a central axis A (parallel to the length of the extension arm 220), or may extend at various angles from 0° to up to 45° in relation to the central axis A.

The shape and size of the hub 231 can be adapted to fit the type of nests that are targeted. For example, when seagull nests are targeted, the hub 231 can be bowl-shaped and can have width W of about 15 to about 30 cm, about 20 to about 28 cm, or about 22 to about 26 cm. In one embodiment, the bowl has a width W of about 25 cm. The bowl-shaped hub 231 can have a depth D of about 1 to about 20 cm, about 2 to about 15 cm, about 3 to about 10 cm, or about 4 to about 8 cm. In one embodiment, the bowl has a depth D of about 5 cm at the center of the bowl. Hubs adapted to fit nests of other birds may be smaller or larger, and may have a smaller or greater depth depending on the nest.

The hub 231 can be constructed of any suitable material, such as metal (e.g., steel, stainless steel, copper, aluminum, iron, etc.), plastic, fiberglass, carbon fiber, wood, a fiber based material, or a combination thereof. In preferred embodiments the hub 231 is constructed of material that is easy to clean, such as metal or plastic. In one embodiment the hub 231 is constructed of stainless steel.

The piercing elements 233 may include any pointed or sharp elements, such as pins, blades, razor blades, or similar. The piercing elements 233 may be adapted to pierce or break the eggs in the nest. Preferably the piercing elements 233 have a small sharp distal end that is capable of piercing an egg shell with minimal pressure, and causing minimal pick up of material or air drag while the drone 100 is flying. Accordingly, the piercing elements 233 may be constructed to be long and thin with a pointed or sharp distal end. For example, the piercing elements 233 used for controlling seagull populations may be about 1.5 to about 6 cm, about 1.8 to about 5 cm, about 2.0 to about 4 cm, or about 2.2 to about 3.5 cm long and have a diameter of about 0.5 to about 2.0 mm, about 0.6 to about 1.5 mm, or about 0.7 to about 1.2 mm. The piercing elements 233 may vary in length throughout the tool portion 230. For example, the piercing elements 233 positioned around the center of the hub 231 may be longer than piercing elements 233 positioned around the edges of the hub 231. This may be particularly useful in an embodiment where the hub 231 has a very shallow bowl shape or is flat.

The piercing elements 233 may be constructed of any suitable material, such as metal (e.g., steel, stainless steel, copper, aluminum, iron, etc.), plastic, or carbon fiber. In a preferred embodiment, the piercing elements 233 comprise metal, such as stainless steel.

In one exemplary embodiment, the tool portion 230 comprises a bowl-shaped hub 231 constructed from stainless steel and having a width of about 25 cm and a depth of about 5 cm, with a plurality of piercing elements 233 constructed of stainless steel with a length of about 2.5 cm and a thickness of about 1 mm or less, where the piercing elements 233 are welded to the outer surface of the hub 231, extending radially from the outer surface and positioned about 3-4 cm apart throughout the outer surface of the hub 231.

In an alternative embodiment, such as that shown in FIG. 3B, the hub 231 is smaller and includes the second end 222 of the extension arm 220 such that piercing elements 233 or other sharp instruments are coupled directly with the second end 222, extending as spokes from the second end 222.

The extension arm 220 attaches the tool portion 230 to the drone 100 and facilitates positioning and engaging the tool portion 230 with the eggs and/or the nest. The extension arm 220 is constructed to have a suitable length so that the tool portion 230 extends below any landing gear 113 that may be positioned on the underside of the drone 100. Preferably the tool portion 230 extends far enough below the drone 100 that the draft caused by the rotors does not interfere with the positioning and engaging. The extension arm 220 may have a length of about 50 to about 130 cm, about 65 to 125 cm, or about 80 to about 120 cm. In one exemplary embodiment, the extension arm 220 is about 100 cm long.

The extension arm 220 may comprise an upper section 220A and a lower section 220B. In some embodiments, one of the sections (e.g., the upper section 220A) is constructed of a rigid material and the other section (e.g., the lower section 220B) is constructed of a flexible material to minimize impact to the drone 100 when the tool portion 230 engages with the eggs or nest. For example, the rigid section can be constructed of metal, plastic, fiberglass, carbon fiber, wood, or a similar material and may have a tubular construction. The flexible section may be constructed of a flexible material (e.g., plastic or rubber), or may be constructed of a rigid material (e.g., metal, plastic, fiberglass, carbon fiber, or wood) but have a flexible construction. For example, the flexible section may include a metal or plastic spring, chain mesh, or a chain link encased in a plastic sheet. Alternatively, the upper and lower sections 220A, 220B can be constructed out of the same or similar materials. In the exemplary embodiment shown in FIGS. 1 and 2, the extension arm 220 comprises a rigid upper section 220A and a flexible lower section 220B, where the lower section 220B comprises a spring. The flexible section may provide flexibility to the extension arm 220 in a vertical direction and/or a horizontal direction such that when the drone 100 is lowered and the tool portion 230 engages with the nest or the eggs, the impact on the drone 100 is minimized.

The first end 221 of the extension arm 220 may be permanently or removably coupled with the drone 100. The second end 222 of the extension arm 220 may be permanently or removably coupled with the tool portion 230. Further, the lower section 220B may be permanently or removably coupled with the upper section 220A of the extension arm 220. Removable coupling may include, for example, threading, screws, or clips. Permanent coupling may include, for example, welding, gluing, or an integral molding construction.

The extension arm 220 may be fixed in its position extending downward below the drone 100, or may be movable (e.g., pivotable or retractable/extendable) relative to the drone 100. In the embodiment shown in FIG. 1, the extension arm 220 has a flight position PF (shown in phantom), where the extension arm 220 is positioned in a horizontal or substantially horizontal position, and an engagement position PE, where the extension arm 220 is positioned in a vertical or substantially vertical position below the drone 100. The position of the extension arm 220 may be actuated by an actuator 210 (e.g., a motor) coupled with the extension arm 220 by gears 223 or a hinge mechanism. The extension arm 220 may further optionally be held in the flight position by a safety mechanism that disengages when the actuator 210 actuates the extension arm 220 to the engagement position. The actuator 210 may be powered by the drone's power source 116 or may have its own power source.

The extension arm 220 may be extendable and/or retractable and may have an extended engagement position and a retracted flight position. Extension and/or retraction of the arm can be controlled manually or through an automated mechanism including a motor and a power source.

In alternative embodiments the egg managing device 200 comprises a quick release and a wire connecting the tool portion 230 to the extension arm 220 or to the drone 100, and the tool portion 230 is dropped using the quick release onto the eggs to effect disrupting the eggs. The weight of the tool portion 230 can be optimized to effectively disrupt the eggs while not being too heavy for the drone 100 to carry.

The movement of the extension arm 220 on the drone 100 is preferably automated and is controlled by the remote control system 400. For example, the actuator 210 may be connected to the drone control unit 140, which receives control signals from the remote control system 400 via the receiver 521.

Alternative embodiments may comprise other tools and means for managing eggs. For example, the tool portion 230 may comprise a blunt object that can be used to break eggs. In another alternative embodiment, the tool portion 230 comprises a grabber that is capable of grabbing eggs or the nest. The grabber may include a plurality of fingers and any suitable mechanism for moving and controlling the fingers to grab. In some embodiments other methods and devices to render the eggs non-viable can be used, such as a hook, a scoop, a planar spatula, a reservoir and nozzle for spraying the eggs or the nest with a chemical composition (e.g., an oil or a surfactant) or a microwave source for irradiating the eggs with microwaves.

The system 1 may include one or more cameras. The system 1 may comprise a primary camera 510 coupled with the drone 100 that is wirelessly connected (e.g., through a Wi-Fi, BLUETOOTH, or cellular network connection) through a transmitter 520 to a control unit and/or to a monitor 430 or screen, and can be used to transmit a real-time video image of the areas below and/or surrounding the drone 100. The primary camera 510 may be positioned on the underside of the drone 100 and may be capable of moving its focus. For example, the primary camera 510 may be capable of movement along three axes to be able to provide images of the area under and around the drone. The primary camera 510 may be a commercially available high definition digital camera capable of wireless communication. The drone 100 may also include a secondary camera 240 that may be positioned at the distal end of the disruptor 200. For example, a pinhole camera may be positioned on the hub 231 of the disruptor 200.

In some embodiments, the system 1 includes a geo positioning system (GPS) including a GPS receiver 522 that can be used to locate the drone 100. The GPS may be used to record location data, to set coordinates and lock the position of the drone 100, and to prepare maps of the areas (e.g., roof tops) being treated including position of the nests in the area. The data can also be used for trending and monitoring of bird populations.

The system 1 may further include one or more safety features. For example, the drone 100 may include a mechanism (e.g., a latch, a hook, or a gear) for securing the extension arm 220 into the flight position PF during flight, or another mechanism for preventing accidental contact with the disruptor 200. The system 1 may also be configured to detect the remaining level of available power in the power source 116 and to have the drone 100 return "home" (e.g., to the remote control system 400 or another position that has been designated "home") if available power is below a threshold value (e.g., 10% or 20% of full charge).

Figure 4:
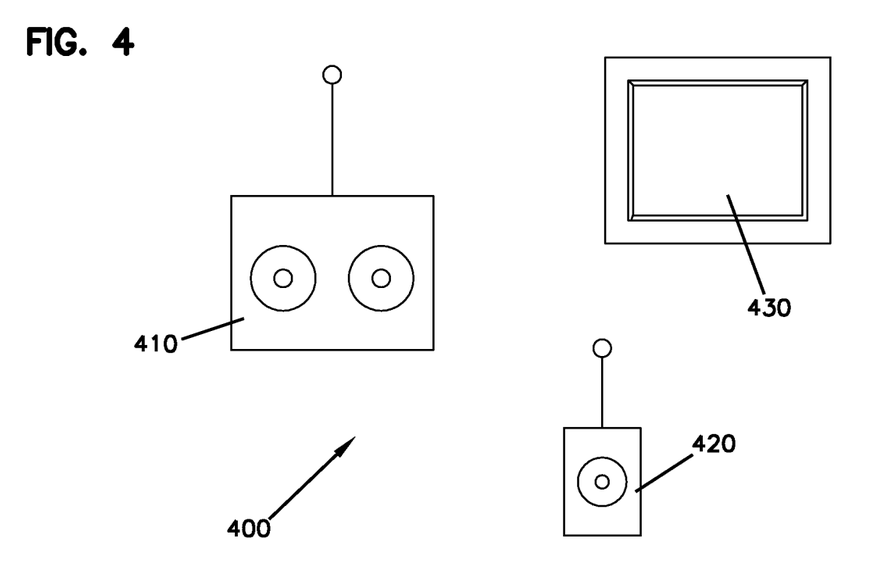
FIG. 4 shows a schematic view of a control system for the system for managing bird populations.

According to at least some embodiments, the system 1 comprises a remote control system 400 operated by one or more operators to control the drone 100. As shown in FIG. 4, the remote control system 400 may include one or more remote control units. In one embodiment, the remote control system 400 includes a first control unit 410 that is used to fly and control the drone 100, and a second control unit 420 that can be used to operate the camera 510, the extension arm 220 and/or to fine tune the position of the drone 100 above a nest. The first and second control units 410, 420 may be separate units or may be integral. The remote control system 400 may also include one or more monitors 430 or screens for viewing the wirelessly transmitted video from the one or more cameras 510, 240. The monitor 430 may be separate from the first and second control units 410, 420, or may be integral with one or both of the control units. If the monitor 430 is separate from the first and second control units 410, 420, the monitor 430 and the first and/or second control units 410, 420 may be wirelessly connected (e.g., through a Wi-Fi, BLUETOOTH, or cellular network connection), or may be connected by wire.

The system 1 of the present disclosure includes a drone 100 equipped with a disruptor 200. The drone 100 may include a frame 110 with a main body 111, a plurality of rotor arms 112 with rotors 120, and landing gear 113. A motor 114 powered by a power source 116, such as a rechargeable battery, can be housed inside the main body 111. The disruptor 200 may comprise an extension arm 220 permanently or removably attached to the bottom of the frame 110 or another part of the drone 100, such as the side, one of the rotor arms 112, or the landing gear 113. The extension arm 220 includes an upper section 220A and a lower section 220B, where one of the sections may be constructed of a rigid material and the other section may be constructed of a flexible material, or the sections may be constructed of the same material. The extension arm 220 may be extendable and/or retractable and may have an extended engagement position and a retracted flight position. The extension arm 220 is coupled with a tool portion 230 and may optionally include a camera 240. The tool portion 230 may optionally be removable and/or interchangeable and may comprise a hub 231 having any suitable shape, such as spherical, ovoid, flat, irregular, or be shaped like a bowl, coupled with one or more piercing elements 233. The piercing elements 233 may include any pointed or sharp elements, such as pins, blades, razor blades, or similar, and may be constructed to be long and thin with a pointed or sharp distal end. For example, the piercing elements 233 may be about 1.5 to about 6 cm, about 1.8 to about 5 cm, about 2.0 to about 4 cm, or about 2.2 to about 3.5 cm long and have a diameter of about 0.5 to about 2.0 mm, about 0.6 to about 1.5 mm, or about 0.7 to about 1.2 mm. The piercing elements 233 may vary in length throughout the tool portion 230. In alternative embodiments the tool portion 230 may comprise other tools, such as a blunt object, a grabber, a hook, a scoop, a planar spatula, a reservoir and nozzle, and/or a microwave source. The system 1 may further include one or more safety features. The system 1 may also include one or more cameras that can be wirelessly connected through a transmitter 520 to a control unit and/or to a monitor 430 or screen. The drone 100 includes a drone control unit 140 connected to a receiver 521. The system 1 comprises a remote control system 400 that may include one or more remote control units, e.g., a first control unit 410 and a second control unit 420, and one or more monitors 430. In some embodiments, the system 1 includes a geo positioning system (GPS) including a GPS receiver 522.

In one embodiment, the system 1 is operated by lowering the extension arm 220 to the engagement position; positioning the drone 100 above a nest; and lowering the drone 100 so that the tool portion 230 engages with the eggs in the nest. In some embodiments the extension arm 220 is deployed (e.g., lowered) after the drone 100 has been positioned above the nest. The process can be monitored through a monitor 430 by viewing the wirelessly transmitted video from at least one of the cameras 510, 240. Feed from the primary camera 510 positioned on the underside of the drone 100 can be used to monitor the location of the nests, the surroundings of the drone, and general positioning of the drone 100, while feed from the secondary camera 240 can be used to fine tune the position of the drone 100 and engagement with the eggs.

In some embodiments, a first operator operates the first control unit 410 used to fly the drone, while a second operator operates the second control unit 420 to operate the camera 510 or the extension arm 220, and/or to fine tune the position of the drone 100 above a nest. When the drone 100 is lowered, the weight of the system 1 causes the tool portion 230 (e.g., the piercing elements 233) to engage with and to disrupt the eggs in the nest. In a preferred embodiment, the tool portion 230 pierces the eggs without further breakage of the eggs. However, in some embodiments, the tool portion 230 comprises a blunt instrument that crushes the eggs. After engaging with and disrupting the eggs, the drone 100 is withdrawn from the nest and can be positioned above another nest. It is believed that piercing the eggs without further breakage may have the advantage that the bird is unaware that the egg has been damaged and thus does not proceed to create additional eggs. It is also believed that when the eggs fail to hatch that the bird may perceive the nest as an undesirable nesting location and identify an alternative location for the next breeding season.

While certain embodiments of the invention have been described, other embodiments may exist. While the specification includes a detailed description, the invention's scope is indicated by the following claims. The specific features and acts described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A system for managing bird populations, the system comprising:
    (a) a drone; and
    (b) a disruptor comprising an extension arm having a proximal end and a distal end, the proximal end being operatively coupled with the drone, and the distal end comprising a tool portion,
    wherein the tool portion comprises a piercing element constructed for engagement with one or more eggs in a nest.

2. The system of claim 1, wherein the system further comprises a remote control system.

3. The system of claim 2, wherein the remote control system comprises one or more remote control units and a monitor.

4. The system of claim 2, wherein the remote control system is adapted for communication with the drone.

5. The system of any one of claim 3, wherein the one or more remote control units are adapted to send signals to the drone, and wherein the drone comprises one or more receivers for receiving the signals.

6. The system of any one of claim 2, wherein the drone comprises a transmitter for sending signals or data or both.

7. The system of any one of claim 2, wherein the drone comprises a GPS receiver.

8. The system of claim 7, wherein the remote control system is capable of receiving GPS data from the drone.

9. The system of claim 1, wherein the tool portion comprises a hub with a distal surface and a plurality of piercing elements, and wherein the plurality of piercing elements extend outwardly from the distal surface of the hub.

10. The system of claim 9, wherein the hub has a bowl shape, and wherein the distal surface of the hub is a convex surface of the bowl shape.

11. The system of claim 9, wherein the plurality of piercing elements comprise needles.

12. The system of claim 9, wherein the plurality of piercing elements are coupled with the hub at a proximal end of each piercing element, and wherein the plurality of piercing elements comprise a sharp distal end.

13. The system of claim 9, wherein the plurality of piercing elements are constructed of metal.

14. The system of claim 9, wherein the plurality of piercing elements are constructed of stainless steel.

15. The system of claim 9, wherein the hub has a width of about 15 to about 30 cm.

16. The system of claim 9, wherein the hub has a depth of about 1 to about 20 cm.

17. The system of claim 1, wherein the disruptor further comprises a disruptor actuator for actuating a position of the extension arm between a flight position and an engagement position.

18. The system of claim 17, wherein the disruptor actuator is capable of maintaining the extension arm in the flight position when the drone is flying.

19. The system of claim 1, wherein the proximal end of the extension arm is coupled with an underside of the drone.

20. A method for managing bird populations with a drone, wherein the drone comprises a disruptor comprising an extension arm having a proximal end and a distal end, the proximal end being operatively coupled with the drone, and the distal end comprising a tool portion constructed to engage with eggs, the method comprising:
 (a) flying the drone above a bird's nest;
 (b) positioning the drone above the bird's nest; and
 (c) descending the drone to disrupt eggs in the bird's nest.

21. The method of claim 20, wherein the tool portion comprises a plurality of piercing elements constructed to pierce one or more eggs in the bird's nest.

22. The method of claim 20, wherein the drone comprises a GPS receiver and a transmitter for transmitting GPS data, and wherein the drone is positioned above the bird's nest using the GPS data.

23. The method of claim 20 further comprising recording GPS data on birds' nest locations.

24. The method of claim 20 further comprising ascending the drone and repeating steps (a)-(c).

* * * * *

UNITED STATES PATENT AND TRADEMARK OFFICE
CERTIFICATE OF CORRECTION

PATENT NO. : 10,327,424 B2
APPLICATION NO. : 15/601015
DATED : June 25, 2019
INVENTOR(S) : Steven Ollier It is certified that error appears in the above-identified patent and that said Letters Patent is hereby corrected as shown below:

On the Title Page (72) Inventor: "Strilingshire (GB)" should read --Stirlingshire (GB)--

Signed and Sealed this
Seventh Day of January, 2020

Andrei Iancu
*Director of the United States Patent and Trademark Office*